3,384,687
MICROSPHERE FORMING PROCESS FOR AQUEOUS SALT SOLUTIONS USING DISSOLVED AMMONIA IN A DEHYDRATING SOLVENT
Herbert P. Flack, 22 Durham Road E., Beaverbrook, Ellicott City, Md. 21043; Moises G. Sanchez, 480 Severnside Drive, Severna Park, Md. 21146; and Charles T. Lamberth, Rte. 2, Daisey Road, Woodbine, Md. 21797
No Drawing. Filed Aug. 2, 1966, Ser. No. 569,579
6 Claims. (Cl. 264—.5)

ABSTRACT OF THE DISCLOSURE

A process for preparing microspheres of metal oxides, or metal oxides containing carbon by dispersing droplets of an aqueous feed containing dissolved metal salts in a dehydrating solvent containing dissolved ammonia and recovering the partially dehydrated spheres from the solvent.

This invention relates to a process for producing highly uniform metal oxide and metal oxide-carbon microspheres.

In summary, this invention is a process for forming microspheres of metal oxides from an aqueous feed containing from 0.01 gram per liter up to saturation quantities of dissolved salts of metal cations selected from the group consisting of $U^{+4}$, $(UO_2)^{+2}$, $Th^{+4}$, $Pu^{+4}$, $(PuO_2)^{+2}$, $(ZrO)^{+2}$, $Be^{+2}$, $Y^{+3}$, lanthanides, and mixtures thereof. The feed can contain from 0–499 grams per liter of suspended metal oxide particles having a size of less than one micron, said metal oxide being selected from the group consisting of uranium dioxide, uranium trioxide, thorium dioxide, plutonium dioxide, plutonium trioxide, zirconium dioxide, beryllium oxide, yttrium oxide, lanthanide oxides, and mixture thereof. The feed can also contain from 0 to 5 moles of colloidal carbon per mole of metal in the feed. The feed is dispersed in a dehydrating solvent in the form of droplets, and partially dehydrated microspheres are recovered from the solvent. The dehydrating solvent contains a quantity of dissolved ammonia sufficient to provide a pH within the range of from 8 to 13.5. The preferred pH range of dehydrating solvent is from 8.5 to 10.0. The feed can also contain an ammonia releasing agent. The preferred ammonia-releasing agents comprise hexamethylene tetramine, acetamide, ammonium carbamate, ammonium cyanate, urea, and mixtures thereof. The ammonia-releasing agent concentration in the feeds can be from 0 to 300 percent of the concentration required to precipitate the metal in the feed as the hydrous oxide. The dehydrating solvent preferably has a solubility for water of from 1 to 30 weight percent. The microspheres are preferably dried to a water content of less than 50 weight percent before they are recovered from the dehydrating solvent.

Actinide metal oxides are very important in the field of nuclear fuels. Current reactor designs, especially the designs of the high temperature gas-cooled reactors, have placed very demanding requirements on the fuel employed. The fuel must be resistant to oxidation and fission product release. The fuel must be near theoretical density to provide the requisite efficiency. The fuel elements are usually formed by dispersing the fuel materials in a ceramic matrix which is then pressed or compacted into the desired shapes under pressure, and the fuel material must be sufficiently strong to withstand the severe stresses present during compaction. Furthermore, the particles must have a uniform shape and size to effect homogeneous distribution of fuel in the matrix.

Actinide oxides and carbides in the form of spherical particles meet these requirements. The spherical shape provides the requisite strength. Resistance to oxidation and fission product release can be obtained by coating the spherical particles with a refractory metal, metal oxide or pyrolytic graphite. However, great difficulty has been encountered in obtaining uniform particles, especially since microspheres found suitable for this application are in the 50 to 200 micron diameter range.

Processes for producing microspheres by solvent dehydrating metal salt solutions have been previously disclosed. The solutions, mixed with an ammonia-releasing agent, were dispersed into a dehydrating solvent. The dehydrating solvent temperature was elevated to cause substantial in situ decomposition of the ammonia-releasing agent, and metal oxide microspheres were produced. It was found, however, that this process could not always be conveniently followed. When the feed was not immediately employed to form microspheres, precautions were necessary to prevent gradual ammonia release and metal oxide gelation. Furthermore, higher solvent temperatures were required to effect the desired ammonia release.

It is an object of this invention to provide an alternative process for forming microspheres from the solutions of metal oxide salts which does not require premixing the solution with an ammonia-releasing agent and which does not require the higher solvent temperatures needed to decompose the ammonia-releasing agents. It is still another object of this invention to make microsphere cores containing metal oxide by contacting, with a dehydrating solvent containing dissolved ammonia, a solution of the respective metal salt, which can also contain metal oxide particles and colloidal carbon.

In general, the process of this invention comprises dispersing an aqueous feed containing dissolved metal salts in the form of droplets in a dehydrating solvent containing dissolved ammonia, and recovering partially dehydrated microspheres from the solvent. The droplets are dispersed in the top of a column containing upwardly flowing dehydrating solvent, the falling droplets contact the solvent counter-currently, and the dehydrated microspheres are removed from the bottom of the column. Solvent is removed from the top of the column, dewatered, and recycled to the bottom of the column.

A suitable extraction column and solvent recovery system is disclosed in application Ser. No. 506,231, filed Nov. 3, 1965, now Patent No. 3,345,437. This apparatus comprises an upright column with means for introducing the feed and removing dehydrating solvent at the top and with means for introducing the dehydrating solvent and removing dehydrated microspheres from the bottom thereof. The solvent removed from the top of the column is scrubbed with water to remove dissolved salts therefrom during the solvent recovery procedure. The dehydrating solvent can be ammoniated during this step by scrubbing it with an ammoniated solution. Alternatively, gaseous ammonia can be introduced into the dehydrating solvent before entering the bottom of the column.

The feed can be dispersed in the dehydrating solvent in several ways. The feed can be injected directly into the countercurrently flowing solvent through a hypodermic needle or other small tube, forming droplets in the solvent. The feed can also be injected through a small tube into a concurrently flowing stream of dehydrating solvent, allowed to form into droplets, and the dispersion can then be introduced into the countercurrently flowing stream of dehydrating solvent. Alternatively, the feed can be emulsified in an immiscible liquid such as the dehydrating solvent, and the emulsion can be introduced into the top of the column. Any technique by which the feed droplets can be formed and/or introduced into the dehydrating solvent can be employed.

The metal compounds which are desirable in nuclear reactor fuel elements include uranium dioxide, uranium trioxide, thorium dioxide, plutonium dioxide, plutonium trioxide, diluent oxides such as zirconium dioxide, yttrium oxide and beryllium oxide, and the respective carbides of the metal oxides. In the process of this invention microspheres containing these oxides are formed from an aqueous feed containing dissolved salts of these metals. These salts include soluble salts of $U^{+4}$, $(UO)^{+2}$, $Th^{+4}$, $Pu^{+4}$, $(PuO_2)^{+2}$, $(ZrO)^{+2}$, $Be^{+2}$, $Y^{+3}$, lanthanides, and mixtures thereof. The feed contains at least 0.01 gram per liter up to saturation quantities and preferably from 50 to 200 grams per liter of the dissolved metal salts. The lanthanides are defined as the rare earth elements having atomic numbers from 57 (lanthanum) to 71 (lutetium).

The feed can also contain from 0–499 and preferably less than 150 grams per liter of suspended metal oxide particles having a size of less than one micron and preferably less than 0.5 micron. Particles of the above-described actinide, lanthanide, and diluent oxides are suitable. Preferably, the concentration of dissolved metal salts should be lower, less than 200 p.p m., when the feed contains metal oxide particles in order to prevent undue precipitation of the particles. Aquasols of the respective metal oxides can be used to provide the desired particles.

Microspheres suitable for forming metal carbide microspheres contain mixtures of the respective metal oxide and carbon. For this purpose, the feed can contain from 0–5 moles of colloidal carbon per mole of metal in the feed. Fine-sized carbons such as Mogul and Regal SRF–S carbons produced by Cabot Corporation are suitable. The carbon can be dispersed by adding it to the feed solution and dispersing it with an ultrasonic probe. Alternatively, the carbon can be dispersed in water containing a dispersing agent with an ultrasonic probe or a high shear mixer, and the dispersion can be mixed with the feed solution. Any suitable technique for forming a carbon dispersion in the feed can be used.

Application Ser. No. 448,260, filed Apr. 15, 1965, now Patent No. 3,312,631 describes a process for forming metal oxide and metal oxide-carbon microspheres from metal salt solutions containing an ammonia-releasing agent. Ammonia-releasing agents are compounds which are relatively stable at ambient or room temperatures and, when heated above these temperatures by the dehydrating solvent, decompose rapidly to release ammonia in the droplets. Because ammonia is slowly released by these compounds at ambient temperatures, it is necessary to refrigerate feeds containing ammonia-releasing agents when lengthy storage is required.

The process of this invention can be advantageously used to form microspheres from feeds containing ammonia-releasing agents, providing a superior product. Also less than stoichiometric quantities of the ammonia-releasing agent can be used, giving a wider safety factor if the feed is not used immediately. A high quality product can be obtained by the process of this invention even when no ammonia releasing agent is added to the feed.

Examples of suitable ammonia-releasing agents are hexamethylenetetramine, acetamide, ammonium carbamate, ammonium cyanate, urea and mixtures thereof. The quantity of ammonia-releasing agent in the feeds can be any amount up to the amount sufficient to form a metal oxide gel from the metal salts and suspended metal oxides in the feed. Preferably amounts insufficient to form a gel of all the constituents are employed. The quantity of ammonia-releasing agent that can be employed can be from 0 up to 300 percent of the stoichiometric quantity required to precipitate the metal salts from the solution as hydrous metal oxides. The preferred amount of ammonia-releasing agent is less than 50 percent in excess of the stoichiometric quantity required. The ammonia-releasing agent can be dissolved in the feed solution or it can first be dissolved in water and then added in a solution form. It is desirable to stir the feed solution when the ammonia-releasing agent is added in order to prevent localized concentrations of ammonia-releasing agent and premature precipitation.

The choice of dehydrating solvents for this system is very important. The solvents giving the best results are higher alcohols which have the desired solubility for water. The solvents must be inert, free of objectionable physical properties such as emulsifying tendencies, and must have a density low enough to permit settling of the microspheres. If an ammonia-releasing agent is employed in the feed, the dehydrating solvent must be capable of being heated to a temperature high enough to cause the desired rate of decomposition of the ammonia-releasing agent. The solvent selected must have saturation concentrations with water within a certain range permitting adjustment of the drying conditions. Solvents with solubilities for water of from 1 to 30 percent are satisfactory. Examples of preferred solvents include hexanol, ethyl-hexanol, and ethyl-butanol. Water can be added to solvents with water solubilities which are too high to diminish the effective water solubility. For example, butanol, which has a hot solubility for water of about 28 weight percent is nearly saturated with water when introduced into the column. In contrast ethyl-hexanol, which has a 4 to 6 weight percent hot solubility for water, is circulated to the column in nearly anhydrous form. Hexanol with a 10 to 11 weight percent hot solubility for water preferably is used with a water content of 3 to 6 weight percent.

The temperature of the dehydrating solvent entering the column generally ranges from about 60 to 120° C. while that leaving from the column top is generally from about 10 to 40° C. lower than the temperature of the solvent entering the column. Such temperatures are also sufficient for releasing ammonia within the aquasol droplets when most of the ammonia-releasing agents are employed.

The process of this invention forms highly uniform, dense microspheres. The ammonia enters the dispersed droplets as they fall through the dehydrating solvent, precipitating the metal salt as the oxide and gelling the suspended metal oxide. Any quantity of ammonia can be employed in the dehydrating solvent which will provide adequate ammonia to the feed droplets. Lesser amounts are sufficient if an ammonia-releasing agent is present in the droplets. An amount sufficient to provide a dehydrating solvent pH within the range of from about 8.5 to 10 has been found suitable in most processes.

The aquasol droplets are dried to a final water content of preferably less than 50 weight percent. Drying to less than 25 weight percent water gives optimum results. The partially dehydrated product microspheres may contain unreacted ammonia or other precipitating agent, ammonium salts and other neutralization products. These should be removed prior to sintering. Therefore, the microspheres are treated with concentrated aqueous ammonia to fix any unprecipitated oxide components, washed with water, and dried by heating in a stream of inert gas or in a vacuum. Preferably, they are gradually heated from 40° C. up to 100° C. during drying. The resulting microspheres are then ready for sintering.

The process of this invention is further illustrated by the following specific but non-limiting examples.

Example 1

This example shows the preparation of microspheres of zirconium dioxide by the process of this invention. The feed solution was a zirconium nitrate solution containing the equivalent of 100 g. $ZrO_2$/l. The feed was introduced into the column using the system disclosed in application Ser. No. 364,931, filed May 5, 1964. In this system the feed is introduced into a concurrent flowing stream of dehydrating solvent, and the feed-solvent mixture is then introduced into a countercurrently flowing stream of dehydrating solvent in the column. In Run 1 no ammonia was added to the hexanol dehydrating solvent. In Run 2 ammonia gas was introduced into hexanol as it entered the column. The column conditions are shown in Table A.

TABLE A

|  | Run 1 | Run 2 |
|---|---|---|
| Feed flow rate, cc./min. | 6.1 | 1.7 |
| Solvent pH | 5.1 | 9.0 |
| Solvent flow rate, cc./min.: |  |  |
| To needle assembly | 140 | 140 |
| To column | 410 | 410 |
| Solvent temperature, °C.: |  |  |
| To column | 102 | 102 |
| From column | 61 | 67 |
| To needle assembly | 30 | 28 |
| Boiling temperature | 114 | 116 |

In Run 1, the feed liquid collected in the bottom of the column, and no spheres were formed. In Run 2, product microspheres were formed. These were collected from the bottom of the column and were soaked in a concentrated aqueous ammonia solution for about 15 minutes, were washed with water until substantially free from electrolytes, and were dried. In Run 2 many good spheres were formed. The microspheres had a size of from 173–230 microns.

Example 2

In this example yttrium oxide microspheres were formed. The feed solution was a yttrium chloride solution containing the equivalent of 100 g. $Y_2O_3$/l. The feed solution was formed by dissolving yttrium chloride crystals in water. The feed was processed by the procedure described in Example 1. In Run 3, no ammonia gas was added to the dehydrating solvent. In Run 4 ammonia gas was added to the dehydrating solvent. The column conditions are shown in Table B.

TABLE B

|  | Run 3 | Run 4 |
|---|---|---|
| Feed flow rate, cc./min. | 2.9 | 3.8 |
| Solvent pH | 4.5 | 9.1 |
| Solvent flow rate, cc./min.: |  |  |
| To needle assembly | 140 | 140 |
| To column | 410 | 410 |
| Solvent temperature, °C.: |  |  |
| To column | 102 | 101 |
| From column | 62 | 62 |
| To needle assembly | 29 | 30 |
| Boiling temperature | 114 | 115 |

The product microspheres were ammonia treated, washed, and dried as described in Example 1.

In Run 3 the feed settled as a white liquid in the bottom of the column, and no microspheres were formed. In Run 4 many good spheres were formed. The microspheres had a size within the range of from 173–346 microns.

Example 3

In this example thorium oxide microspheres were produced from a thorium nitrate solution. The thorium nitrate concentration was equivalent to 33 g. $ThO_2$/l. The feed was processed by the procedure described in Example 1. In Run 5, no ammonia gas was added to the dehydrating solvent. In Run 6 ammonia gas was introduced into the solvent. The column conditions are shown in Table C.

TABLE C

|  | Run 5 | Run 6 |
|---|---|---|
| Feed flow rate, cc./min. | 2.9 | 3.2 |
| Solvent pH | 5.0 | 9.3 |
| Solvent flow rate, cc./min.: |  |  |
| To needle assembly | 140 | 140 |
| To column | 650 | 650 |
| Solvent temperature, °C.: |  |  |
| To column | 105 | 106 |
| From column | 71 | 74 |
| To needle assembly | 31 | 31 |
| Boiling temperature | 115 | 115 |

The product microspheres were ammonia treated, washed, and dried as described in Example 1. In Run 5 the feed solution settled as a liquid in the bottom of the column, and no microspheres were formed. In Run 6 microspheres were formed having a size within the range of from 58–290 microns.

Example 4

In this example, uranium trioxide microspheres were formed from a feed solution containing uranyl chloride in a concentration equivalent to 555 g. $UO_2$/l. The feed solution was formed by dissolving uranyl chloride monohydrate crystals in water. In this example ammoniation of the dehydrating solvent was obtained by washing the dehydrating solvent with a 1:5 ammonium hydroxide solution as described in application Ser. No. 506,231, filed Nov. 3, 1965, now Patent No. 3,345,437. In Run 7, the dehydrating solvent was not ammoniated. In Run 8 the dehydrating solvent was washed with the ammonium hydroxide solution. The feed was processed by the procedure described in Example 1. The column conditions are shown in Table D.

TABLE D

|  | Run 7 | Run 8 |
|---|---|---|
| Feed flow rate, cc./min. | 0.4 | 0.3 |
| Solvent pH | 5.2 | 9.7 |
| Solvent flow rate, cc./min.: |  |  |
| To needle assembly | 140 | 140 |
| To column | 410 | 410 |
| Solvent temperature, °C.: |  |  |
| To column | 96 | 96 |
| From column | 58 | 52 |
| To needle assembly | 30 | 30 |
| Boiling temperature | 108 | 109 |

The product microspheres were ammonia treated, washed, and dried as described in Example 1.

In Run 7 the feed solution settled as a liquid in the bottom of the column. In Run 8 good yellow microspheres having smooth surfaces were formed.

Example 5

In this example, uranous oxide microspheres were formed from a uranous chloride feed containing the equivalent of 50 g. $UO_2$/l. The uranous chloride was obtained by electroreduction of an uranyl chloride solution. A solution of uranyl chloride and hydrochloric acid containing 99.2 g. of $UO_2$/l. was passed into an electrolytic cell to obtain the electroreduction. The uranous chloride solution was diluted to contain 50 g. $UO_2$/l. before injection into the microsphere column. In Run 9 the dehydrating solvent was not ammoniated. In Run 10 ammonia gas was added to the dehydrating solvent. The feed was processed by the procedure described in Example 1. The column conditions are shown in Table E.

TABLE E

|  | Run 9 | Run 10 |
|---|---|---|
| Feed flow rate, cc./min. | 1.8 | 1.4 |
| Solvent pH | 4.7 | 9.9 |
| Solvent flow rate, cc./min.: |  |  |
| To needle assembly | 140 | 140 |
| To column | 410 | 410 |
| Solvent temperature, °C.: |  |  |
| To column | 98 | 98 |
| From column | 62 | 61 |
| To needle assembly | 31 | 30 |
| Boiling temperature | 107 | 107 |

The product microspheres were ammonia treated, washed, and dried as described in Example 1.

In Run 9 the feed solution collected as a liquid in the bottom of the column. In Run 10 microspheres having a size within the range of from 50–300 microns were formed. Spheres having a size of from 50–100 microns had good glossy surfaces. Larger spheres had rougher surfaces.

Example 6

In this example, uranous dioxide-yttrium oxide microspheres were formed. A uranous chloride solution containing the equivalent of 99.2 g. $UO_2$/l. was made in an electrolytic cell by the electroreduction of a uranyl chloride solution. A solution containing the equivalent of 100 g. $Y_2O_3$/l. was made by dissolving yttrium chloride crystals in water. A feed was made by mixing 150 ml. of the uranous chloride solution with 66 ml. of the yttrium chloride solution. In Run 11 the dehydrating solvent was not ammoniated. In Run 12 ammonia gas was added to the dehydrating solvent. The feed was processed as described in Example 1. The column conditions are shown in Table F.

TABLE F

|  | Run 11 | Run 12 |
|---|---|---|
| Feed flow rate, cc./min | 3.0 | 1.8 |
| Solvent pH | 4.3 | 10.0 |
| To needle assembly | 140 | 140 |
| To column | 410 | 410 |
| Solvent temperature, ° C.: |  |  |
| To column | 101 | 99 |
| From column | 62 | 61 |
| To needle assembly | 30 | 30 |
| Boiling temperature | 114 | 109 |

In Run 11 the feed settled in the bottom of the column as a liquid. A few particles were observed. In Run 12 many good microspheres were formed. The microspheres had a size within the range of from 115–230 microns.

Example 7

In this example uranous dioxide-zirconium dioxide microspheres were formed. A uranous chloride solution containing the equivalent of 99.2 g. $UO_2$/l. was prepared by the procedure described in Example 6. Zirconium oxychloride crystals were dissolved in water to make a solution containing the equivalent of 200 g. $ZrO_2$/l. The feed was made by mixing these two solutions together so that the resulting solution contained the equivalent of 30 weight percent $ZrO_2$ in terms of the overall oxide composition. In Run 13 the dehydrating solvent was not ammoniated. In Run 14 gaseous ammonia was added to the dehydrating solvent. The feed was introduced into the column as described in Example 1. The column conditions are shown in Table G.

TABLE G

|  | Run 13 | Run 14 |
|---|---|---|
| Feed flow rate, cc./min | 3.4 | 2.1 |
| Solvent pH | 4.4 | 8.6 |
| Solvent flow rate, cc./min.: |  |  |
| To needle assembly | 140 | 140 |
| To column | 410 | 410 |
| Solvent temperature, ° C.: |  |  |
| To column | 102 | 100 |
| From column | 62 | 61 |
| To needle assembly | 30 | 28 |
| Boiling temperature | 114 | 113 |

The product microspheres were ammonia treated, washed, and dried as described in Example 1.

In Run 13 some small spheres having a size of about 20 microns were formed but attempts to make larger spheres produced saucer shaped particles and liquid. In Run 14 good spheres exhibiting no cracks or craters were formed. These spheres had a size of from 20–288 microns.

Example 8

In this example, uranous oxide microspheres were formed from a uranous chloride feed solution containing uranium dioxide sol particles. The uranium dioxide sol was prepared in an electrolytic cell from uranyl chloride and hydrochloric acid. The uranous chloride was prepared in the same cell from the same type of feed stock. A 59 ml. quantity of uranous dioxide sol containing 127 g. $UO_2$/l. was mixed with 227 ml. of a uranous chloride solution containing the equivalent of 99.2 g. $UO_2$/l. to form the feed. In Run 15 the dehydrating solvent was not ammoniated. In Run 16 ammonia gas was introduced into the dehydrating solvent. The feed was introduced into the dehydrating solvent as described in Example 1. The column conditions are shown in Table H.

TABLE H

|  | Run 15 | Run 16 |
|---|---|---|
| Feed flow rate, cc./min | 3.4 | 2.8 |
| Solvent pH | 5.0 | 8.7 |
| Solvent flow rate, cc./min.: |  |  |
| To needle assembly | 140 | 140 |
| To column | 410 | 410 |
| Solvent temperature, ° C.: |  |  |
| To column | 102 | 102 |
| From column | 62 | 62 |
| To needle assembly | 30 | 30 |
| Boiling temperature | 114 | 115 |

The product microspheres were ammonia treated, washed, and dried as described in Example 1.

In Run 15 solid fragments but no microspheres were formed. In Run 16 many good spheres were formed.

Example 9

In this example uranous dioxide-zirconium dioxide microspheres were formed from a zirconyl chloride solution containing uranium dioxide sol particles. The uranium dioxide sol employed to form the feed contained the equivalent of 127 g. $UO_2$/l. and was prepared in an electrolytic cell using a uranyl chloride-hydrochloric acid feed stock. The zirconyl chloride solution was obtained by dissolving zirconyl chloride crystals in water to form a solution containing the equivalent of 200 g. $ZrO_2$/l. The feed solution was made by mixing 66.6 ml. of zirconyl chloride solution with 300 ml. of the sol to yield a mixture containing 30 weight percent zirconium dioxide in terms of the overall oxide composition. The feed was introduced into the column as described in Example 1. In Run 17 the dehydrating solvent was not ammoniated. In Run 18 ammonia gas was added to the dehydrating solvent. The column conditions are shown in Table J.

TABLE J

|  | Run 17 | Run 18 |
|---|---|---|
| Feed flow rate, cc./min | 2.5 | 2.8 |
| Solvent pH | 3.2 | 8.9 |
| Solvent flow rate, cc./min.: |  |  |
| To needle assembly | 140 | 140 |
| To column | 410 | 700 |
| Solvent temperature, ° C.: |  |  |
| To column | 101 | 104 |
| From column | 60 | 75 |
| To needle assembly | 29 | 30 |
| Boiling temperature | 113 | 114 |

The product microspheres were ammonia treated, washed, and dried as described in Example 1.

In Run 17 fractured and cratered microspheres were formed. In Run 18 many good spheres were formed although some fragments were formed under the operating conditions employed.

Obviously many modifications and variations of the invention as hereinabove set forth can be made without departing from the essence and scope thereof, and only such limitations should be applied as are indicated in the claims.

We claim:
1. A process for forming microspheres of metal oxides from an aqueous feed containing
  (a) from 0.01 g./l. up to saturation quantities of dissolved salts of metal cations selected from the group consisting of $U^{+4}$, $(UO_2)^{+2}$, $TH^{+4}$, $(PuO_2)^{+2}$, $Pu^{+4}$, $(ZrO)^{+2}$, $Be^{+2}$, $Y^{+3}$, lanthanides, and mixtures thereof,
  (b) from 0–499 g./l. of suspended metal oxide particles having a size of less than one micron, said metal oxide being selected from the group consisting of uranium dioxide, uranium trioxide, thorium dioxide, plutonium dioxide, plutonium trioxide, zirconium dioxide, beryllium oxide, yttrium oxide, lanthanide oxides, and mixtures thereof,
  (c) from 0–5 moles of colloidal carbon per mole of metal in the feed,
comprising the steps of dispersing the feed in the form of droplets into a dehydrating solvent, and recovering par- tially dehydrated microspheres from the dehydrating solvent, the dehydrating solvent containing sufficient dissolved ammonia to provide a solvent pH within the range of from about 8–13.5.

2. The process of claim 1 wherein the dehydrating solvent solubility for water is from 1–30 weight percent.

3. The process of claim 1 wherein the microspheres have been dried to a water content of less than 50 weight percent before they are removed from the dehydrating solvent.

4. The process of claim 1 wherein ammonia is introduced into the dehydrating solvent by contacting it with an aqueous ammonia solution.

5. The process of claim 1 wherein gaseous ammonia is introduced into the dehydrating solvent.

6. The process of claim 1 wherein the aqueous feed contains an ammonia-releasing agent selected from the group consisting of hexamethylenetetramine, acetamide, ammonium carbamate, ammonium cyanate, urea, and mixtures thereof in an amount insufficient to form a gel from the metal compounds in the feed.

References Cited

UNITED STATES PATENTS

| | | |
|---|---|---|
| 3,171,715 | 3/1965 | Kleistenber _____ 23—345 |
| 3,290,122 | 12/1966 | Clinton et al. |

FOREIGN PATENTS

| | | |
|---|---|---|
| 1,180,358 | 10/1964 | Germany. |
| 1,185,596 | 1/1965 | Germany. |
| 904,679 | 8/1962 | Great Britain. |
| 997,314 | 7/1965 | Great Britain. |
| 1,012,511 | 12/1965 | Great Britain. |

CARL D. QUARFORTH, *Primary Examiner.*

BENJAMIN R. PADGETT, *Examiner.*

S. J. LECHERT, Jr., *Assistant Examiner.*